(No Model.)

M. MERICHENSKI.
AUTOMATIC CHECK VALVE AND APPARATUS CONNECTED THEREWITH.

No. 273,575. Patented Mar. 6, 1883.

WITNESSES.
Geo. F. Downing.
Am Bright.

INVENTOR
Moska Merichenski
By F. O. W. Cleary.
ATTY.

United States Patent Office.

MOSKA MERICHENSKI, OF LONDON, COUNTY OF MIDDLESEX, ENGLAND.

AUTOMATIC CHECK-VALVE AND APPARATUS CONNECTED THEREWITH.

SPECIFICATION forming part of Letters Patent No. 273,575, dated March 6, 1883.

Application filed July 21, 1882. (No model.) Patented in England October 3, 1881, No. 4,287; in Germany October 29, 1881, No. 18,678; in France November 2, 1881, No. 145,622, and in Belgium November 3, 1881, No. 56,128.

*To all whom it may concern:*

Be it known that I, MOSKA MERICHENSKI, a subject of the Emperor of Russia, residing at London, in the county of Middlesex, England, have invented an Improved Automatic Check-Valve and Apparatus Connected Therewith for Regulating the Flow of Liquids, (for which I have obtained a patent in Great Britain, No. 4,287, bearing date October 3, 1881,) of which the following is a specification.

My invention relates to a novel construction and arrangement of check-valve and apparatus in connection therewith for regulating the flow of liquids—such as oil to the wicks of lamps, whether hanging, bracket, table, ship, railway, or any other kind of lamp having one or more burners for burning mineral or vegetable oils; also applicable to boilers or stoves where a regular and continuous flow of oil is required for heating the same, and for regulating the supply of water to cisterns in lieu of the ball-cocks or other existing appliances for that purpose, and generally to any arrangement of apparatus for providing a regular and continuous flow of water, beer, or other liquids.

Figure 1:
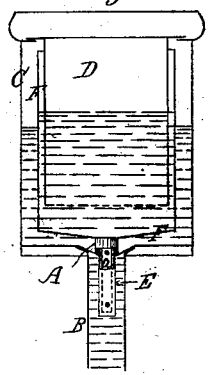
Figure 2:
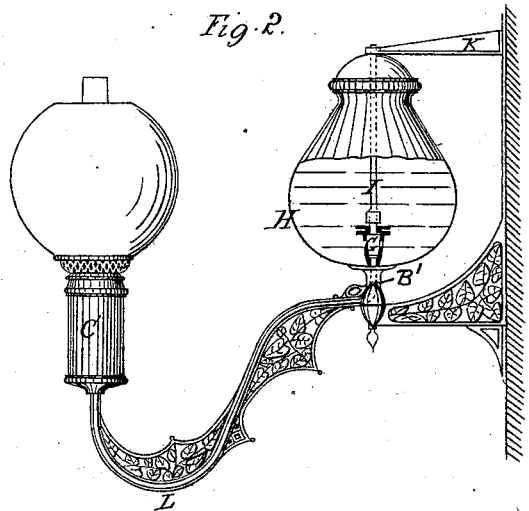
Figure 3:
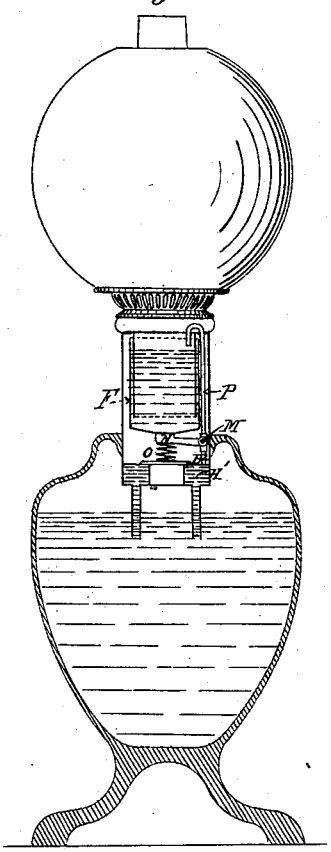
Figure 4:
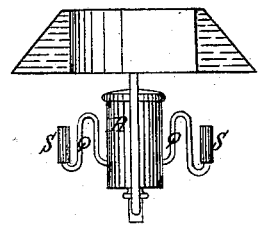

On the accompanying sheet of drawings, Figure 1 represents a detached sectional view of my improved check-valve and regulating apparatus, and Figs. 2 to 4 various applications of the same, like letters of reference indicating corresponding parts in the respective figures.

My invention consists, as applied to oil-lamps, of a specially-constructed check-valve, A, Fig. 1, placed between the pipe B, leading from the oil-reservoir, and the outer portion, C, of the wick-reservoir D. This valve A is formed with a hollow stem, $a$, open at its lower end and perforated on its circumference near the valve-seat. The hollow stem $a$ slides in a tube or socket, E, closed at its lower end and perforated thereat on its circumference. To the upper side of the valve A is fixed a cylindrical or other shaped cup or float, F, made of metal, glass, or other suitable material, which partially occupies the outer portion, C, of the wick-reservoir D, and into which dips the wick-reservoir D, containing the wick or wicks of the burner, and formed at the bottom with a strainer, as shown. The oil from the oil-reservoir passes through the perforated tube or socket E, and, entering the hollow valve-stem $a$ at its lower end, passes through it and through the perforation therein into the outer portion, C, of the wick-reservoir D, in which it rises and floats or lifts the cylindrical cup or float F to its utmost limit, when the oil, still continuing to rise, passes over the upper edge of the cup or float F into the latter until at a certain level therein, when the weight of the contained oil, overcoming the specific gravity due to the displacement of the cup or float F in the surrounding oil, will cause the cup or float F to fall in the outer portion, C, of the wick-reservoir D, and with it the hollow valve-stem $a$ falls in the tube or socket E and closes the perforation in each, thereby stopping the flow of oil from the oil-reservoir to the wicks. As the oil is burned at the latter, the upward pressure caused by the displacement of the cup or float F becomes greater than the weight of the latter with its contained oil, and the cup or float F consequently rises and admits more oil through the valve-stem $a$ to the outer portion, C, of the wick-reservoir D. By this means the oil in the cup or float F is maintained at a constant level and the light preserves its maximum and normal intensity in lieu of diminishing as the oil is consumed, according to the present system.

In Fig. 2, which shows the application of my invention to bracket-lamps, this check-valve and apparatus C are combined with a cock or tap, G, which is fixed in the supply-pipe B' at the bottom or other convenient part of the oil-reservoir H, its plug being connected by a fixed stem or handle, I, to the fixed wall-bracket K above the reservoir in such a manner that on turning the lamp and swinging bracket L against the wall the shell or casing of the cock or tap G turns on the fixed plug, thereby closing the cock and preventing further passage of oil from the reservoir H to the check-valve and regulator C at the lamp. A similar arrangement may be applied to hanging lamps or chandeliers, the stem or handle of the cock being attached to any convenient fixture.

Fig. 3 shows the application of my invention to table-lamps, in which case I substitute for the check-valve A, above described, a tap or cock, M, fixed in the supply-pipe B² from the oil-reservoir H', and its plug furnished with a lever or handle, N, the end of which carries the cup or float F, before described. A spiral spring, O, is placed between the end of the lever or handle N and any fixed portion of the lamp below, its elasticity being exactly determined to support at a given compression the weight of the cup or float F with a certain quantity of contained oil. As the oil is burned at the wick or wicks of the burners the spring O raises the lightened cup or float F, and with it the lever or handle N of the cock M, which is thereby opened and allows the oil to pass from the oil-reservoir H' through a pipe, P, which is a continuation of pipe $B^2$, from the cock M into the cup or float F, a constant level and continuous flow of oil being thus maintained in the latter. For railway-lamps, as shown in Fig. 4, siphon-pipes Q may be placed between the wick-reservoir R and the wick-holders S for further checking any excessive flow of oil to the wicks.

When applying my improved check-valve and regulating apparatus to water-supply cisterns, the cylindrical cup or float F is open to the cistern and rises against a cover or stop on the outer portion of its reservoir, the water being drawn off for use by a bent pipe, one leg of which dips into the water contained in the cup or float and the other leg or service-pipe furnished with cocks or taps in the usual manner.

Figure 5:
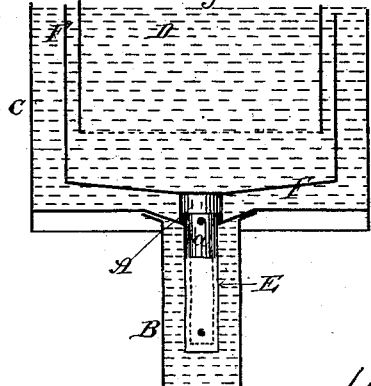

Fig. 5 is an enlarged view of the valve mechanism shown in Fig. 1.

I am aware that it is not broadly new to provide a lamp with a float and valve adapted to be automatically operated to open and close the oil-opening; also, that it is not new, broadly, to combine with a valve a rod, pivoted lever, and stopper or plug for regulating the supply of oil. Hence I do not claim those elements, broadly; but

I claim as my invention—

1. The combination, with the outer portion, C, of the wick-reservoir, of the check-valve A, having a hollow stem, $a$, and carrying a cup or float, F, and a tube or socket, E, provided with a perforation near its lower end and adapted to receive said stem $a$, substantially as set forth.

2. The combination, with the check-valve A, of the cock or tap G and its casing, and a stem or handle, I, said casing being adapted to be turned to close the oil-passage, substantially as set forth.

3. The combination of tap or cock M, fixed in the pipe $B^2$ and furnished with a lever or handle, N, carrying the cup or float F, with spring O, substantially as described.

MOSKA MERICHENSKI.

Witnesses:
E. T. HUGHES,
FRANK G. HUGHES.